United States Patent [19]
Morin et al.

[11] Patent Number: 5,956,800
[45] Date of Patent: Sep. 28, 1999

[54] SUPPORTING BASE FOR A WIPER MECHANISM

[75] Inventors: Pascal Morin; Joël Princet, both of Chatellerault, France

[73] Assignee: Valeo Systemes d'Essuyage, La Verriere, France

[21] Appl. No.: 08/875,961

[22] PCT Filed: Nov. 29, 1996

[86] PCT No.: PCT/FR96/01897

§ 371 Date: Nov. 3, 1997

§ 102(e) Date: Nov. 3, 1997

[87] PCT Pub. No.: WO97/20715

PCT Pub. Date: Jun. 12, 1997

[30] Foreign Application Priority Data

Dec. 7, 1995 [FR] France ................................. 95 14672

[51] Int. Cl.⁶ .................................................... B60S 1/06
[52] U.S. Cl. ................. 15/250.31; 15/250.3; 296/96.17; 296/192
[58] Field of Search ........................... 15/250.27, 250.28, 15/250.3, 250.31; 296/192, 96.17, 96.15; 74/42, 51; 248/200, 214

[56] References Cited

U.S. PATENT DOCUMENTS

| | | | |
|---|---|---|---|
| 4,938,526 | 7/1990 | Sannomiya et al. | 296/192 |
| 5,074,613 | 12/1991 | Unterborn et al. | 15/250.31 |
| 5,203,602 | 4/1993 | Eustache | 15/250.1 |
| 5,396,681 | 3/1995 | Hara | 15/250.31 |

FOREIGN PATENT DOCUMENTS

| | | | |
|---|---|---|---|
| 306361 | 3/1989 | European Pat. Off. | 15/250.3 |
| 359733 | 3/1990 | European Pat. Off. | 15/250.3 |
| 0 484 175 | 5/1992 | European Pat. Off. . | |
| 0 689 975 | 1/1996 | European Pat. Off. . | |
| 2621287 | 4/1989 | France | 15/250.3 |
| 2640211 | 6/1990 | France | 15/250.31 |
| 2667833 | 4/1992 | France | 15/250.27 |
| 37 41 172 | 6/1988 | Germany . | |
| 43 33 484 | 5/1994 | Germany . | |
| 875036 | 8/1961 | United Kingdom | 15/250.3 |
| 2077094 | 12/1981 | United Kingdom | 15/250.27 |
| 2 218 622 | 11/1989 | United Kingdom . | |
| 2219932 | 12/1989 | United Kingdom | 15/250.3 |
| 2258145 | 2/1993 | United Kingdom | 15/250.3 |

*Primary Examiner*—Gary K. Graham
*Attorney, Agent, or Firm*—Morgan & Finnegan, LLP

[57] ABSTRACT

A supporting base for a wiper mechanism comprising a plate assembly forming a base for the components of the mechanism, particularly wiper drive members, and further comprising means for attaching the base to the bodywork of a vehicle, and at least one elongate structural member attached to the plate assembly and including a free end section supporting a bearing for a wiper shaft. Said plate assembly consists of two stacked plates of which the first plate is attached to the structural member while the other plate comprises said means for attaching the base to a part of the bodywork of the vehicle, and means are provided for joining said plates together.

7 Claims, 2 Drawing Sheets

SUPPORTING BASE FOR A WIPER MECHANISM

BACKGROUND OF THE INVENTION

The present invention relates to a support structure for a screen wiper mechanism.

More particularly, the invention relates to a support structure of the type comprising a plate which constitutes a support for various components of the mechanism, in particular for driving components of a screen wiper, and which includes means for fastening it onto a bodywork element of the vehicle, being also of the type comprising at least one structural element of elongate form, which is fixed to the support plate and which has a free terminal portion that carries for example a bearing for supporting a screen wiper drive spindle and/or complementary means for fastening the support structure on the body of the vehicle.

In accordance with a known design, which is for example described and shown in the document FR-A-2,621,287, the support plate is made in the form of a metal plate which is bent, press formed and reinforced by ribs, and of which a side edge portion is curved so as to define an open semi-cylindrical housing which receives a tubular portion, of complementary form, of the elongate structural element, which is for example made in the form of a bent and curved tube, the structural element being fixed to the curved edge portion of the metallic support plate by welding.

An opposite edge of the one-piece support plate has extensions or deformed portions which receive fastening elements, such as for example silentblocs.

The manufacture, and therefore the spatial configuration, of the metal support plate is particularly complex, because the fastening elements have to be arranged within the space in relatively precise positions which enable the support plate to be fastened on surrounding components of the bodywork of the vehicle.

In addition, the known one-piece design of the support plate makes it necessary to provide a specific support plate for each application, that is to say for each particular vehicle.

BRIEF SUMMARY OF THE INVENTION

An object of the present invention is to propose a new design for a support structure of the type defined above, which overcomes the above mentioned drawbacks and which, in particular, enables the components of the support structure to be standardized while simplifying manufacture.

With this in view, the invention proposes a support structure characterized in that the support plate is made in the form of two superimposed plate elements, of which the first plate element is fixed to the structural element, the second plate element including the means for fastening the support structure on a bodywork element of the vehicle, and in that it includes means connecting the two plate elements together.

According to further features of the invention:

the means connecting the two plate elements together consist of assembly means, in particular of the screw and nut type, for mounting a component for driving the screen wiper on the support plate, with the bodies of the assembly means extending through the two superimposed plate elements;

the driving component is a motorized reduction gear drive unit mounted on the support structure through a set of assemblies of the screw and nut type, distributed around a hole which is formed in the two superimposed plates for passage therethrough of the output shaft of the motorized reduction gear unit;

the first plate element lies substantially in one plane and is extended by a lateral portion for fastening it on the structural element;

the lateral fastening portion of the first plate element is so configured as at least partly to match the form of the structural element on which it is fixed;

the second plate element lies substantially in one plane and is extended by a lateral lug for fastening it on the body of the vehicle;

the lateral fastening lug of the second plate element lies in a plane substantially at right angles to that of the support plate;

a damping element is interposed between the two superimposed plate elements;

the damping element is made in the form of a plate of elastomeric material interposed between complementary portions of mutually facing surfaces of the two superimposed plate elements;

the damping element has holes for passage therethrough of the bodies of the assembly means;

the damping element has a hole for mounting the output shaft of the motorized reduction gear unit therein;

the support plate includes a housing which receives a portion of the structural element, and the housing consists of two half housings, each of which is formed in one of the two superimposed plate elements and is open in the plane of the junction of the two superimposed plate elements.

BRIEF DESCRIPTION OF THE DRAWINGS

Further features and advantages of the invention will appear on a reading of the following detailed description, for an understanding of which reference is made to the attached drawings, in which.

DETAILED DESCRIPTION OF THE INVENTION

Figure 1:
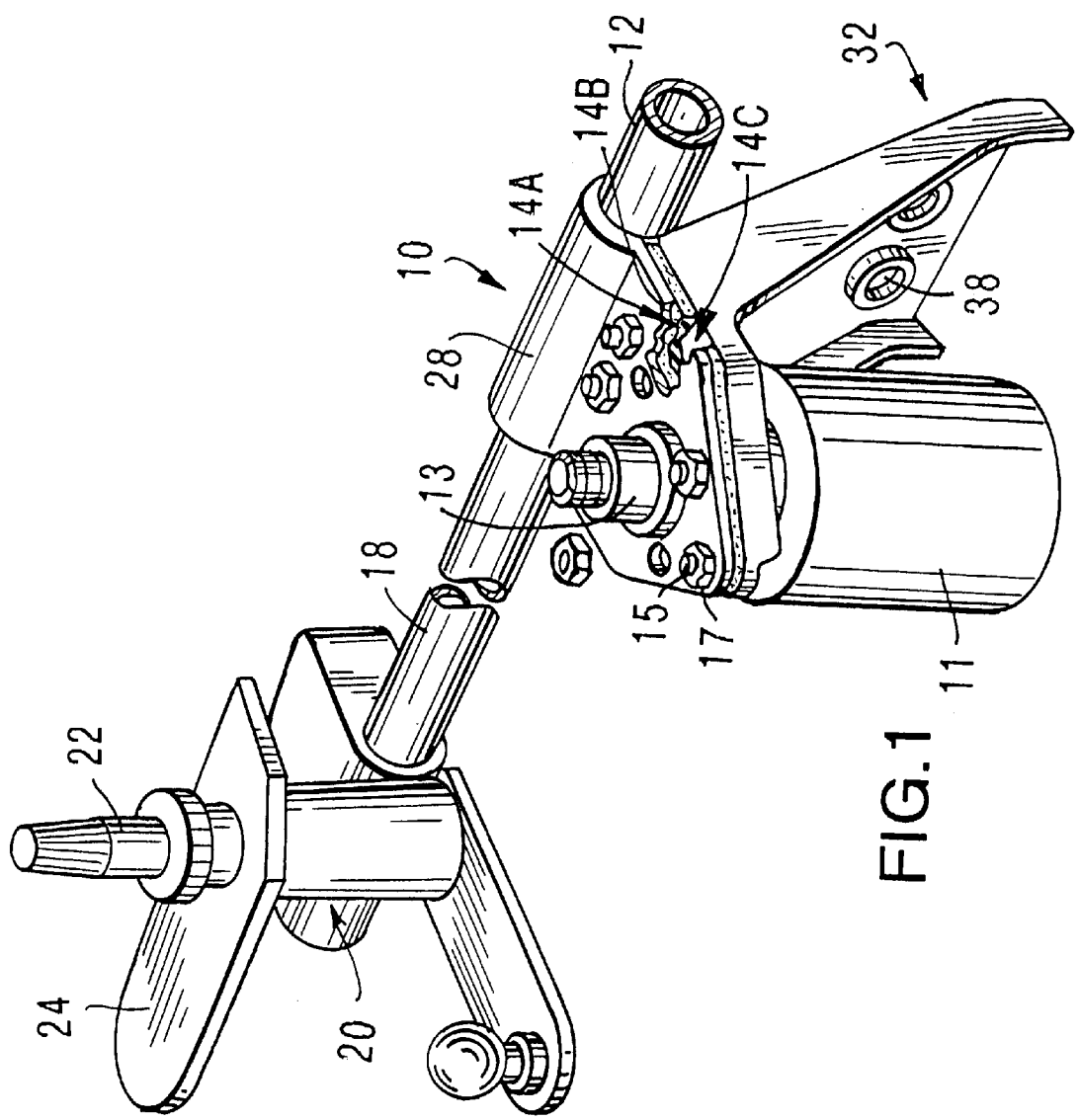
FIG. 1 is a diagrammatic perspective view, shown partly cut away and illustrating a support structure for a screen wiper mechanism made in accordance with the features of the invention, in association with certain other components of the mechanism.

FIG. 1 shows a support structure 10 which, in accordance with a known design, consists essentially of a structural element 12 of generally elongate form which, in this example, consists of a curved and bent metallic tube.

The support structure 10 also includes a plate 14 for supporting driving components for a screen wiper, which include for example a motorized reduction gear drive unit 11.

The support plate 14 is fixed on the structural tube 12, and includes means 16 for fastening the support structure 10 on components of the structure of the body of the vehicle (not shown) that is equipped with the screen wiper mechanism.

As shown in FIG. 1, each of the end portions 18 of the structural tube 12 may be equipped with a bearing 20 in the form of a separate attached element, which receives for rotation therein a spindle 22 for driving a screen wiper in alternating wiping motion, the bearing 20 including a plate 24 for fastening it on the body of the vehicle.

Figure 2:
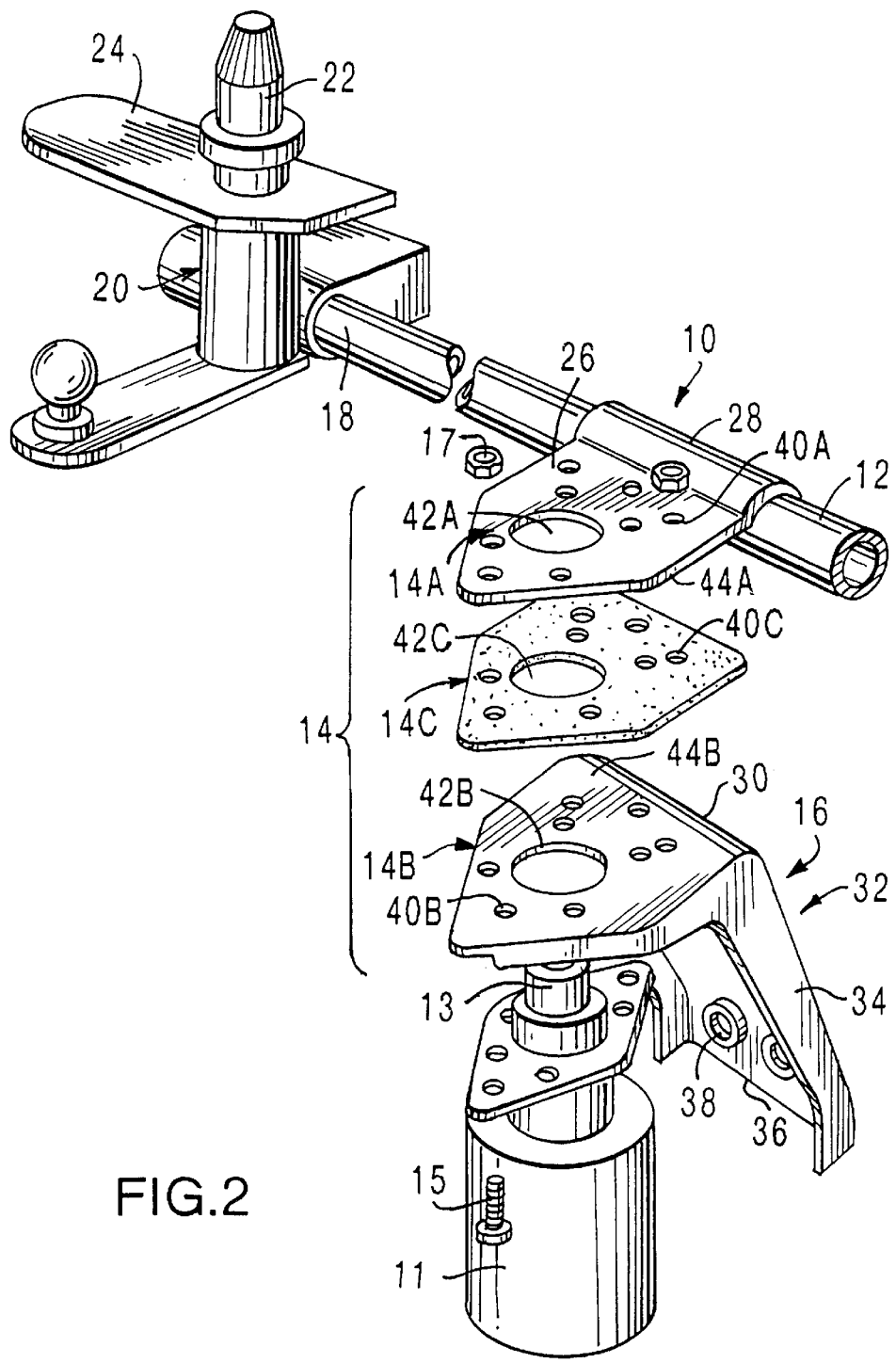
FIG. 2 is an exploded perspective view of the main components of the support structure shown in FIG. 1.

In accordance with the features of the invention, and as can be seen in greater detail in FIG. 2, the support plate 14 is made in two parts in the form of a first plate element 14A and a second plate element 14B.

The first plate element 14A is for example a sheet metal pressing having the general form of a plate, one side edge 26 of which is extended by a lateral portion 28 of semi-cylindrical profile which is fixed on the structural tube 12, for example by welding by a known method.

The first plate element 14A, with the structural tube 12, thus constitutes a first sub-assembly of the support structure 10.

The second plate element 14B is again a sheet metal pressing, which is bent into the form of a plate and which has a contour which is substantially identical with the contour of the main portion of the first plate element 14A.

The second plate element 14B is extended from one of its side edges 30 by a fastening lug 32 which lies in the plane substantially at right angles to the general plane of the second plate element 14B, and which, in this example, is made integrally, in one piece, with the second plate element 14B by bending, press forming, stamping, and/or welding.

The rigidity of the connection between the second plate element 14B and the lateral fastening lug 32 is reinforced by ribs 34.

In the vicinity of its free terminal edge 36, the fastening lug 36 includes elements 38 of known design for fastening the second plate element 14B on the body of the vehicle.

The elements 38 are for example silentblocs, which are mounted in holes through the fastening lug 32.

The first plate element 14A and the second plate element 14B each have a set of holes 40A, 40B which are spaced apart around a central hole 42A, 42B.

When the two plate elements 14A and 14B are disposed facing each other with their respective contours aligned with each other, the holes 40A and 40B and the holes 42A, 42B are in register, in such a way as to permit, respectively, the passage of bodies of assembly means for assembling the two plate elements together, and passage through the holes 42A, 42B of the output shaft 13 of the motorized reduction gear unit fixed on the support plate 14, the latter comprising the two parts 14A and 14B.

In a preferred embodiment of the invention, the means for assembling the two plate elements 14A and 14B together are not dedicated to this purpose only, but they also constitute means for assembling the motorized reduction gear unit to the two-part support plate.

These consist for example of screws 15 of the body of the motorized reduction gear drive unit, which extend through the aligned holes 40A and 40B with their threaded free end portions receiving fastening nuts 17.

Thus the fitting of the motorized reduction gear drive unit on the two-part support plate 14A, 14B, and its assembly by means of the tightening nuts, simultaneously provides rigid connection between the two plate elements 14A and 14B, thus constituting a support structure 10 in the form of the first sub-assembly consisting of the structural tube 12 and the first plate element 14A, and a second, one-piece sub-assembly, consisting of the second plate element 14B with its integral fastening lug 32.

In accordance with another feature of the invention, and in order to reduce the transmission of parasitic vibrations from the screen wiper mechanism towards the body of the vehicle and therefore towards the cabin of the latter, a plate element 14C, constituting a damper, is interposed between the surfaces 44A and 44B, in facing relationship with other, of the plate elements 14A and 14B.

As can be seen in FIG. 2, the plate element 14C, constituting a damper, is for example a plate of elastomeric material having a contour complementary to that of the plate elements 14A and 14B, and having holes 40C and a central hole 42C, which, in the fitted position of the damping plate 14C between the two plate elements 14A and 14B, are aligned, respectively, with the holes 40A, 40B and the holes 42A, 42B.

The fitting of the support plate element 14C is particularly easy during assembly of the various components which constitute the support structure 10, and its final fastening between the two plate elements is assured at the same time as the connection between these last two elements is made by means of the fastening 15, 17 by which the motorized reduction gear unit is assembled on the support structure 10.

Thanks to the arrangement in accordance with the invention, the support plate 14 is made in two parts of relatively simple forms, and it is possible to standardize certain components, that is to say either the first plate element 14A with its means for fastening on the structural tube 12, and/or the second plate element 14B with its fastening lug 32, the matching of different first and second plate elements 14A, 14B enabling support structures 10 to be formed with generally different geometries according to requirements for the mounting of screen wiper mechanism on a motor vehicle.

In a modified embodiment, not shown in the drawings, it is possible to provide in the second plate element 14B, for example in the vicinity of its edge 30, a deformed portion which constitutes a second, cylindrical, half-housing complementary to the half-housing which is constituted by the lateral portion 28 of the first plate element 14A, so that after assembly these two half-housings constitute a housing which receives a portion of the structural tube 12.

Such an arrangement lends rigidity to the assembly, with means immobilizing the structural tube 12 against straight line and rotational movement being able to be formed for example in the half-housing which is formed in the second plate element 14B.

We claim:

1. A support structure for a screen wiper mechanism of a vehicle, the support structure comprising:

a support plate supporting components of the mechanism, a first fastener extending from the support plate for attaching the support plate onto a bodywork element of the vehicle, and at least one structural element of elongate form fixed to the support plate, the structural element comprising a free terminal portion that carries a bearing for supporting a screen wiper drive spindle, wherein the support plate comprises:

a first plate element fixed to the structural element, a second plate element including the first fastener, a damping element in the form of a plate of elastomeric material interposed between the first plate element and the second plate element, and a second fastener connecting the plate elements together.

2. A support structure according to claim 1, wherein the first plate element lies substantially in one plane and includes a lateral portion adapted for fastening the first plate element to the structural element.

3. A support structure according to claim 2, wherein the lateral portion of the first plate element at least partly matches the form of the structural element on which it is fixed.

4. A support structure according to claim 1, wherein the first fastener comprises a lateral lug.

5. A support structure according to claim 4, wherein the lateral lug of the second plate element lies in a plane substantially at a right angle to the plane of the second plate element.

6. A support structure according to claim 1 wherein the damping element has a plurality of assembly holes.

7. A support structure according to claim 1 wherein the damping element has a shaft hole.

* * * * *